United States Patent Office 2,985,963
Patented May 30, 1961

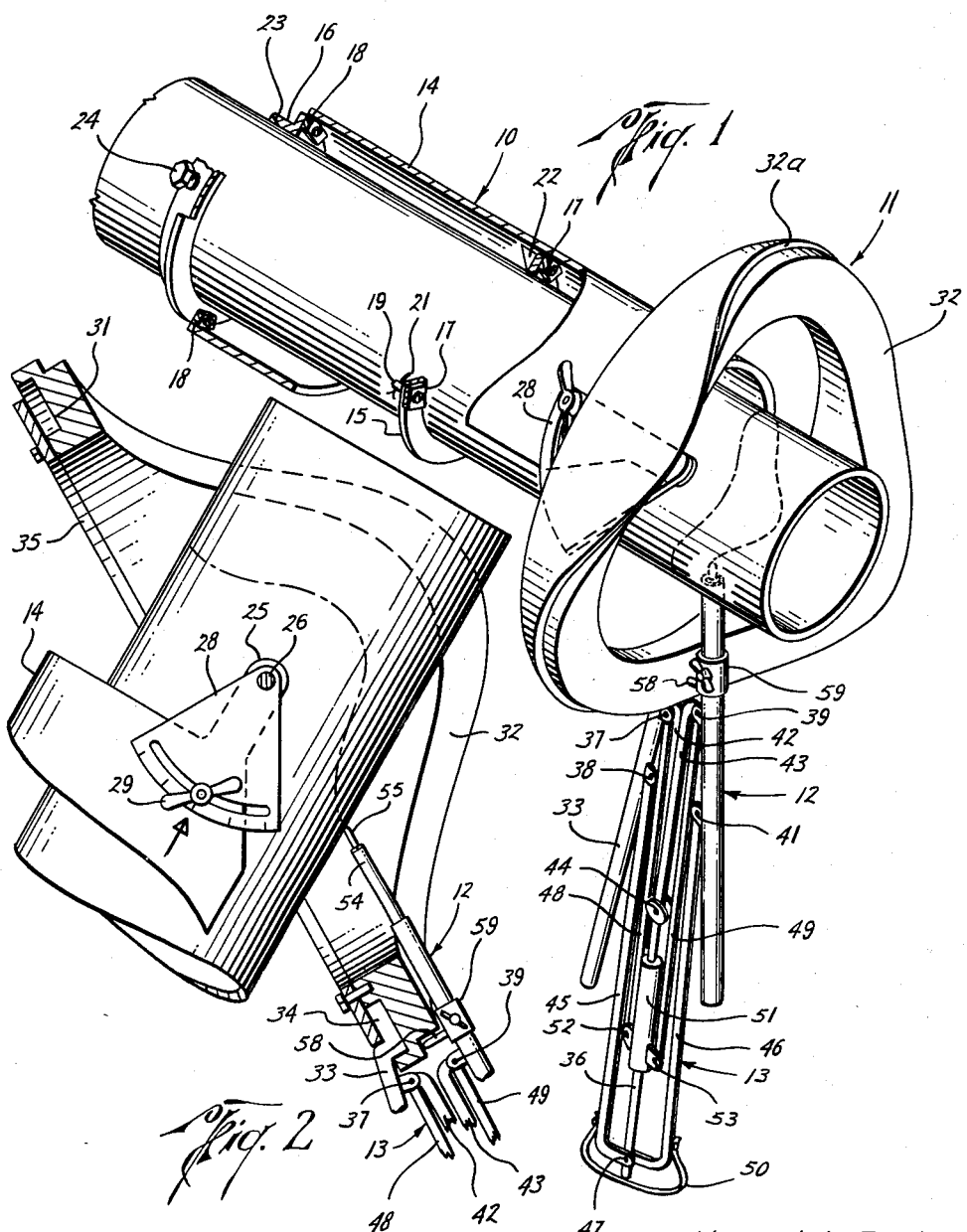

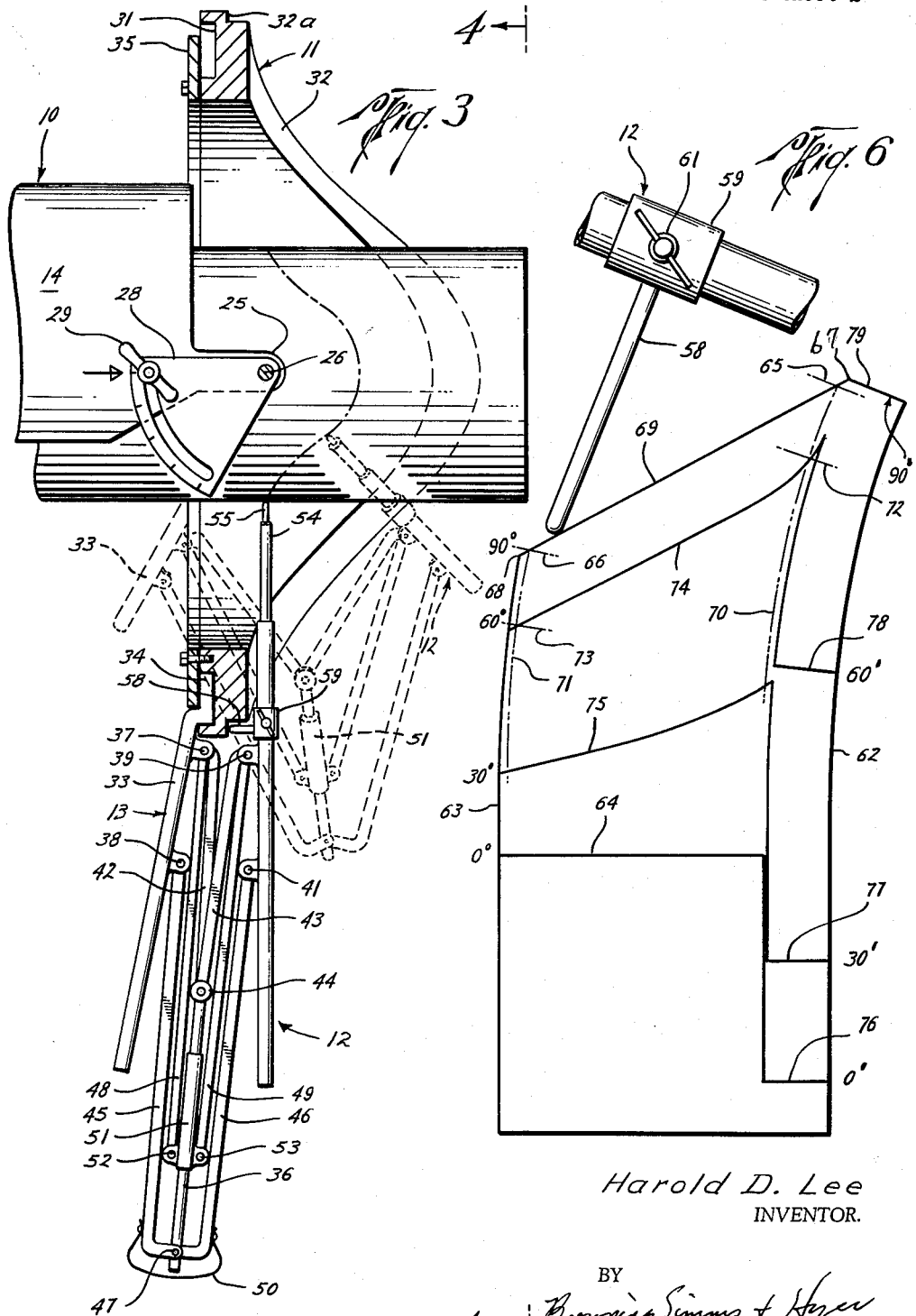

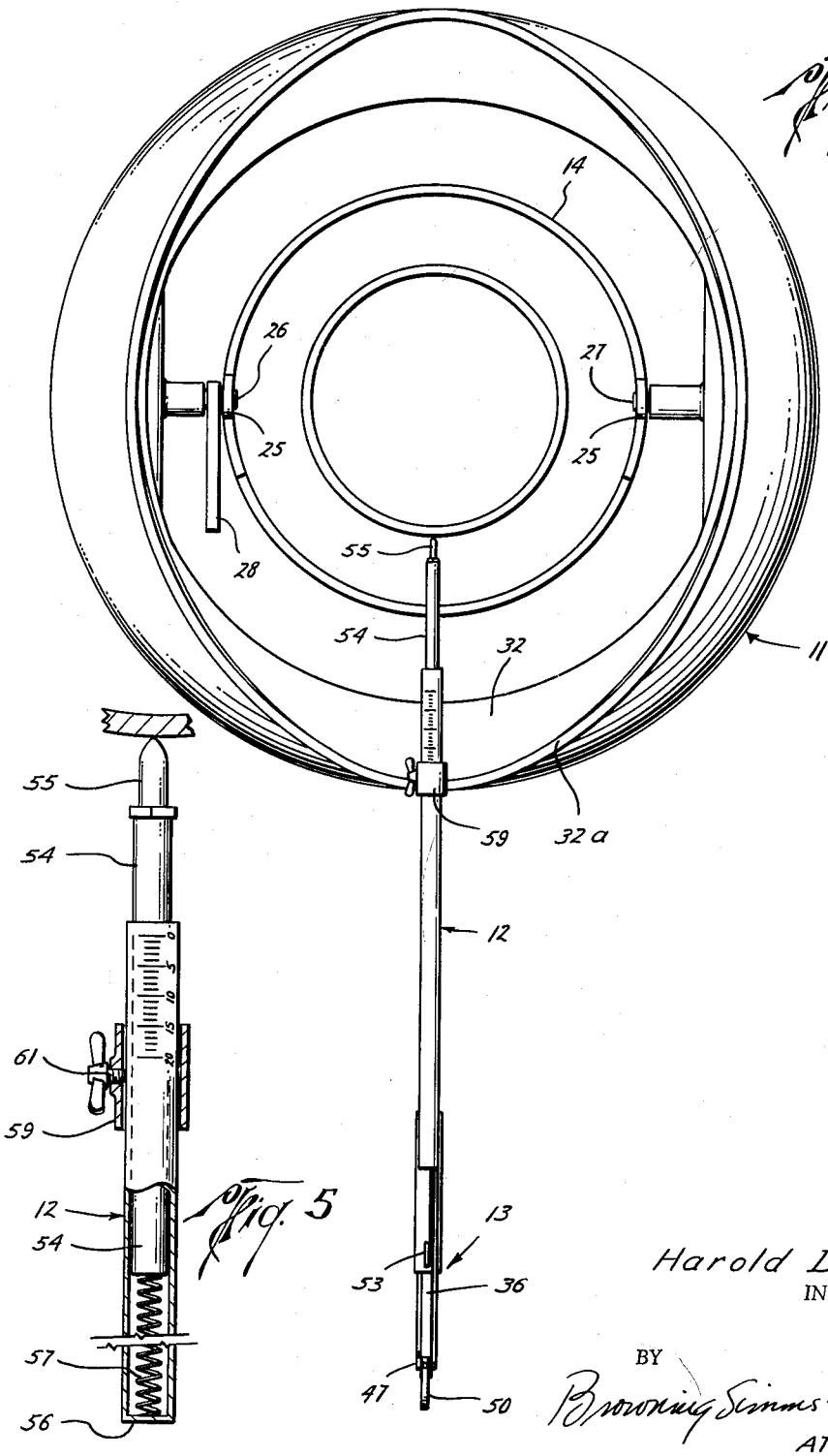

2,985,963
PIPE FABRICATING APPARATUS
Harold D. Lee, Houston, Tex., assignor to C. N. Housh, Houston, Tex.
Filed Apr. 16, 1957, Ser. No. 653,235
12 Claims. (Cl. 33—21)

This invention relates to pipe fabricating apparatus and more particularly to an apparatus for cutting or marking a contour on a branch pipe to shape its end to fit the side wall of a run pipe. Since both cutting and marking of such contours are required in connection with the art of pipe fabrication, both will be termed "fabricating" operations for the purpose of this description and the appended claims.

In the pipe fabricating art, there are many instances in which it is desirable to weld a branch pipe onto a run pipe. The circumstances may call for the two pipes to form an included angle of almost any size and circumstances may dictate that the branch pipe be of equal or smaller diameter than the run pipe.

As pipes are tubular members in cross section, the contour of the cut on the end of the branch pipe changes with the intersecting angle of the two pipes and with the size of the two pipes. It further changes in those cases in which the branch pipe is of smaller diameter than the run pipe.

Various machines have been proposed and some have been used to either mark or cut branch pipe. Those machines which have reached commercial use have been seriously limited in the scope of cuts or marks which they will make. One, for instance, will make a contour cut for a ninety degree intersection only. This machine requires the use of a different interchangeable template for each contour to be cut.

In view of the limited versatility of the machines useful for contouring an end of a pipe, it is the most common practice to use templates which are manually wrapped around a pipe and provide a line to be traced by a welder with soapstone or the like. These templates are usually prepared to order by a draftsman from data or master drawings and discarded after use. This is a time consuming, relatively inaccurate way of marking pipe. Due to draftsmen's error and the possibility of unnoticed movement of the template on the pipe, the scribed mark is sometimes inaccurate. An inaccuracy of the nature of one-quarter of an inch at certain parts of the cut may necessitate recutting of the pipe. The labor cost and accuracy of this method leaves much to be desired.

This invention provides a machine for scribing or cutting branch pipe for intersection with run pipe of the same or larger diameter and at any desired intersecting angle. Furthermore, this invention provides a machine which will perform on pipe of any given size within its design range. For instance, in a machine designed to handle pipe from two and one half to eight inches, the single machine, without exchange of templates or the like, will scribe or cut any size branch between two and one half and eight inches to intersect at any given angle a run pipe of the same or larger size and within the range of two and one half to twelve inches.

If pipe of stepped sizes be cut to form a ninety degree branch connection with pipe of equal size and then telescoped together with the valleys of the cuts intersecting a plane perpendicular to the pipes, it will be found that the cuts in the ends of the pipe will resemble a cut made in a sphere along a radius line swung in the contour of the cut in the larger pipe. Like phenomenon will be observed in pipe cut for fitting run pipe of larger diameter in which the ratio of size between the branch and run pipe is the same in each case; that is, a two inch branch cut to fit a four inch run, a four inch branch cut to fit an eight inch run, etc.

It will also be found that if separate templates be made for all of the various normal size branch pipe within a range of say two and one half to eight inches for a ninety degree intersection with run pipe of equal or larger size and telescoped with their respective valleys intersecting a plane perpendicular to the pipes, the several templates at any given point about the circle will slope from the innermost to the outermost template in a substantially straight line, excepting the one to one ratio templates.

With these phenomena as a starting point, it is possible to devise a single apparatus for scribing or cutting pipe within a given range of sizes using a single cam having multiple cam tracks thereon if the scribing or cutting arm is held pointed toward a reference point on the axis of the pipe being cut as the arm is rotated about the pipe.

This invention provides an apparatus based upon the principles referred to above which will cut pipe of any size to fit a run pipe of the same or a larger size.

If a cam representing telescoped templates or cam tracks be mounted to swing about an axis perpendicular to and intersecting the central axis of a pipe to be cut and passing through this reference point, then cuts or marks on a pipe made by an arm pointing toward the reference point and controlled by the cam will conform to the proper contour for joining the branch pipe to a run pipe at any desired angle.

This invention provides an apparatus in which the cam may be so mounted and pipe of different sizes may be marked or cut for intersecting run pipe of the same or larger size at any desired angle.

An object of this invention is to provide an apparatus for cutting or scribing the proper contour on a branch pipe of any size within a range of sizes for joining with a run pipe at any desired angle in which the run pipe may be the same or larger size than the branch pipe.

Another object is to provide an apparatus for cutting or scribing the proper contour on a branch pipe to intersect a run pipe at any desired angle in which only a single cam track is used to guide the marker arm over the desired contour.

Another object is to provide an apparatus for cutting or scribing the proper contour on a branch pipe of any desired size to join with run pipe of any desired size within a given range using a single unitized machine which requires only two simple manual adjustments to select the contour to be fabricated.

Another object is to provide a mechanism for use with a pipe fabricating apparatus which will maintain a cutting or scribing arm pointed toward a fixed point on the central axis of the pipe while permitting the arm to move longitudinally of the pipe to thereby permit the machine to operate on pipe of different sizes.

Another object is to provide a pipe cutting or scribing apparatus for branch pipe in which a single unitized machine without interchangeable parts can be used to fabricate pipe of different size within a given range.

Another object is to provide a pipe cutting or scribing apparatus for branch pipe in which a single machine may be used to fabricate pipe of different size to be welded to run pipe of the same or larger diameter.

Another object is to provide an apparatus for cutting or scribing branch pipe in which the arm for scribing or cutting the pipe is never tilted more than approximately forty-five degrees from the face of the section of pipe being fabricated to minimize the effect of erroneous adjustment of the machine or wear in its moving parts.

Other objects, features and advantages of the machine will appear from the drawings, the specification, and the appended claims.

In the drawings wherein like reference numerals indicate like parts and wherein there is shown an illustrative embodiment of this invention:

Fig. 1 is a perspective view, with parts broken away, of a pipe scribing machine constructed in accordance with this invention in position on a branch pipe and showing the line scribed by the machine on the pipe in dashed outline;

Fig. 2 is a fragmentary perspective view partly in section of the apparatus of Fig. 1 with the cam tilted to scribe a contour on the pipe for joining with a run pipe at an included angle of less than ninety degrees;

Fig. 3 is a fragmentary elevational view of the apparatus of Fig. 1 with parts of the apparatus shown in cross section and the scribing arm shown at one rotative position about the pipe in solid lines and at another rotative position about the pipe in dashed outline;

Fig. 4 is a view along the lines 4—4 of Fig. 3;

Fig. 5 is a view partly in elevation and partly in section of the scribing arm of the illustrated embodiment; and Fig. 6 is a plot of curves on a cam surface at zero, thirty, sixty, and ninety degrees rotatably of the pipe with the cam surfaces shown reversed from those in the Figs. 1 through 5 embodiment.

The apparatus illustrated includes a mounting means indicated generally at 10 for mounting the apparatus on a pipe, a combination track and cam indicated generally at 11 carried by the mounting means 10, an arm indicated generally at 12 for marking or cutting the pipe, and a mounting means indicated generally at 13 for the arm 12 for maintaining the arm pointed toward a fixed point while permitting it to move longitudinally of the pipe in an amount determined by the cam as the arm is rotated about the pipe.

The means for mounting the apparatus on a pipe to be fabricated may take any desired form which will quickly, easily and accurately position the apparatus concentric with the pipe to be fabricated. The operation of the scribing arm 12 should be about a reference point which lies on the longitudinal axis of the pipe. Therefore, the mounting means should be such as to accurately position the machine about the pipe to be cut so that the arm will automatically point at a reference point on the central axis of the pipe. This mounting means may be provided by the means indicated generally at 10.

The illustrated mounting means is built about a section of pipe 14 of larger size than the range of pipe to be fabricated.

Means are provided for positioning the pipe section 14 about a pipe of any desired size with which the machine is to be used. The positioning means for the pipe section 14 may be provided by reducing collars 15 and 16 secured to circumferentially arranged rings of lugs 17 and 18, respectively. The lugs are secured in the pipe section as by welding. Each of these lugs is provided with a clevis pin 19 permanently secured therein as by welding which aligns with spaced holes in reducing collars 15 and 16. Cotter pins 21 may be used in the customary manner to secure the reducing collars in place on the pins. The collar 15 is provided with circumferentially spaced beveled guides 22 to guide the pipe through the collar as it is inserted about a pipe. The collar 16 is also beveled at 23 for a like purpose. The inner diameter of the collars 15 and 16 should be sized relative to the outer diameter of the pipe to be fabricated to provide a close sliding fit therewith. Obviously, radial dimension of the collars to be used for mounting the pipe section 14 on a pipe to be cut increases for decreasing pipe sizes so as to have a sliding engagement therewith.

The mounting means 10 should be held against movement lengthwise of the pipe while the apparatus is being used and for this purpose one or more studs 24 may be provided in each collar 16 to lock the apparatus against movement longitudinally of the pipe.

The combination track-cam 11 may be mounted on pipe section 14 in any desired manner to permit it to swing about an axis passing through and perpendicular to the central axis of the pipe to be scribed. In the illustrated machine, the mounting means 10 is provided on opposite sides with ears 25 for swingably securing the combination track and cam 11 on the mounting means. The combination cam and track is provided on opposite sides with inwardly extending hinge pins 26 and 27. These pins are non-rotatably carried in the track and cam and are rotatably journaled in the ears 25. Hinge pins 26 and 27 are arranged with their central axes passing through and extending perpendicular to the central axis of the pipe section 14 and, therefore, the axes of the hinge pins will also pass through the central axis of a pipe on which the apparatus is mounted. The point at which the rotational axes of the hinge pins intersect the central axis of the support pipe section 14 and the pipe being fabricated is a reference point toward which the arm 12 is always pointed. Rotation of the combination cam and track about an axis passing through the reference point toward which the arm 12 is pointed will permit the apparatus to scribe pipe for intersecting a run pipe at any desired angle as the scribing arm 12 will be scribing an arc about the reference point regardless of the rotative position of the combination cam and track.

In order to adjustably position the combination cam and track at the desired rotative position, a pie shaped locator plate 28 is non-rotatably carried at its apex by a hinge pin 26. A wing nut 29 cooperates with a bolt mounted in the mounting pipe 14 to lock the plate 28 against rotation at any desired angle to thereby lock the combination track and cam at such angle. The plate 28 may be calibrated and the calibrations cooperate with an arrow on the mounting pipe section 14, as shown, to facilitate adjustment of the apparatus to form the end of a branch pipe for an intersection with a run pipe at a desired angle.

The scribing arm 12 should be supported on the apparatus to move with the cam as it is swung about its hinge axis and to always point to the reference point as the arm is rotated about the pipe if the apparatus is to be used with branch pipe of different sizes. This supporting means for the scribing arm on the embodiment illustrated is on the combination cam-track 11 and includes a track 31. The track 31 is concentric with the pipe when the apparatus is arranged to cut a pipe for a ninety degree intersection. The track is provided by a groove in the face of the cam-track member 11 opening in the opposite side of the member 11 from the cam face 32.

The supporting means for the scribing arm 12 also includes a carrier 33 having a shoe 34 which fits snugly within an arcuate section of the track 31. The shoe is held in the track by an annular flange 35 removably secured to the cam-track member 11 and overlying the radially innermost section of the track 31. Radial space is left between the overhanging flange member 35 and the radially outermost extremity of track 31 to permit the carrier 33 to pass therethrough. It will be understood that carrier 33 is rotated about the apparatus and that shoe 34 runs in the track 31. Shoe 34 serves as an orienting guide for the carrier 33. This arrangement orients the carrier 33 relative to the reference point regardless of its rotative position about the pipe or the angular position of the combination cam-track 11.

Means are provided for connecting the scribing arm 12 to the carrier 33 which will maintain the arm 12 pointed toward the reference point in all positions of the track-cam member 11 as it is swung about its hinge axis and in all rotative positions of the carrier about the pipe. This means permits the arm to move longitudinally of the pipe so that the desired contours may be traced or cut in the pipe. In the apparatus shown, the supporting means for the arm 12 permits the arm 12 to rotate in an arc about the reference point toward and away from the carrier 33. As the arm rotates about the reference point, it is always pointed at the reference point.

The supporting means connecting the scribing arm 12 to the carrier 33 is provided in the embodiment shown by a plurality of pairs of links hinged to the scribing arm and carrier and to an intermediate tie rod 36. Hinge points for these links are provided at 37, 38, 39, and 41. The hinge points 37 and 38 on carrier 33 lie on a line which intersects the reference point. Likewise the hinge points 39 and 41 on the scribing arm 12 lie on a line which intersects the reference point. A first pair of links 42 and 43 are each hinged at one end to hinge points 37 and 39, respectively. At their other ends they are hinged at a common hinge point 44 on the tie rod 36. The links 42 and 43 are of equal length. The second pair of link members are provided by links 45 and 46 each hinged at one end respectively to hinge points 38 and 41 and at their other ends to a common hinge point 47 on tie rod 36. These link members are of equal length.

To achieve the objective desired, the two hinge points 37 and 39 are equidistant from the reference point and likewise the two hinge points 38 and 41 are equidistant from the hinge point and spaced from the two hinge points 37 and 39. The length of the several link arms of the first and second pair identified above may be determined by moving the scribing arm 12 about the reference point through an arc slightly larger than the maximum arc it will traverse during use of the apparatus. Then with the scribing arm in this position, the straight line distance between hinge points 37 and 39 as well as the straight line distance between hinge points 38 and 41 may be determined. The links 42 and 43 will be equal in length to one half of the measured distance between hinge points 37 and 39 and the links 45 and 46 will likewise be equal in length to one half the measured distance between the hinge points 38 and 41. By hinging both pair of links to the tie rod 36, the pairs of links knuckle at their hinge points 44 and 47 as the scribing arm is moved toward and away from the support arm, and if the support arm is held a fixed distance away from the reference point, the support arm will be forced to move in an arc about the reference point and will always point toward the reference point.

Means for forcing the scribing arm to move in an arc a fixed distance from the reference point and toward and away from the support arm 33 may be provided in any desired manner. In the illustrated embodiment, a third pair of links provided by link members 48 and 49 are each hinged at one end to the hinge points 37 and 39, respectively, and at their other ends are slidably connected to the tie rod 36. The slidable connection illustrated is provided by a sleeve 51 slidably mounted on the tie rod 36. The link members 48 and 49 are of equal length.

It will be appreciated from the above that the third pair of links and its sliding connection with the tie rod will cooperate with the other two pairs of links to maintain the angles made by the links of a given pair with the carrier and with the scribing arm equal. Thus, the arm 12 will always point at the reference point. The three pairs of links will cooperate to hold the scribing arm a fixed distance away from the reference point and force it to move in an arc about the reference point toward and away from the carrier 33.

The scribing arm 12 may be equipped to either indicate a line to be cut with a cutting tool or the cutting tool may be carried by the scribing arm itself as will be well understood by those skilled in the art. The most common way of cutting pipe is with a cutting torch and this torch may be carried by the arm or the arm may carry a marking tool such as a soapstone to mark the contour on the pipe to be later followed with a cutting torch to fashion the end of the pipe for joining to a run of pipe.

It will be recalled that the arm 12 remains a fixed distance away from the reference point. As the pipe to be scribed is not a sphere, the scribing instrument must move toward and away from the pipe as the arm moves in its arc toward and away from the carrier 33. For this purpose the arm is provided with a soapstone marker best illustrated in Fig. 5. The arm 12 is hollow and a soapstone holder 54 is slidably received within the hollow arm 12 and carries in its exposed end the soapstone 55 for marking the pipe. A closure 56 is provided in the end of arm 12 remote from the pipe to be marked. A resilient means such as the coil spring 57 is compressed between the soapstone carrier 54 and the closure 56 to resiliently urge the soapstone holder toward the pipe while permitting it to reciprocate in and out of the scribing arm to engage the pipe being marked.

It is also pointed out that the distance of the wall of the pipe being marked from the reference point will vary with the size of the pipe being scribed. This difference in distance will be accommodated by movement of the soapstone holder 54 into and out of the scribing arm 12.

The apparatus thus far described provides a scribing arm which is mounted for rotation about a pipe and which may move longitudinally of a pipe in an arc around a reference point to which it is always pointed. In order to determine the amount of movement of the scribing arm longitudinally of the pipe to cause it to scribe the desired contour, there is provided the cam surface 32 on the combination cam-track member 11. As this surface is mounted for swinging movement about the hinge axis of the member 11, it will be appreciated that the cam surface will swing about the pipe to be scribed with the track, carrier 33, arm 12, and the connecting linkage.

The cam surface 32 is actually a plurality of cam tracks as will appear more fully hereinafter. The cam surface governs the longitudinal movement of the arm 12 toward and away from the carrier 33 by its engagement with the follower 58. The several cam tracks provided by the cam surface 32 are each equidistant from the reference point at all points on the cam surface. Therefore, the follower 58 may be positioned on the scribing arm 12 in a fixed position in which it will engage a cam track on the cam surface and it will engage this cam track as the scribing arm is rotated about the pipe.

To provide for control of the scribing arm by a selected one of the cam tracks on the cam surface 32, the follower 58 is adjustably positionable along the scribing arm 12. This adjustment may be provided by mounting the follower on a sleeve 59 slidably received about the arm 12 and providing a stud 61 screw threaded in the sleeve 59 which will engage the arm 12 as it is screwed into the collar 59. By positioning the collar at a selected point along scribing arm 12 and locking the collar in place, the follower 58 will be positioned to engage the desired track. As best shown in Fig. 5, suitable indicia may be present on the scribing arm for coordination with the sliding collar to assist a person using the apparatus in correctly positioning the follower. Arbitrary indicia such as the numerals 1 through 20 illustrated are preferred to pipe sizes as several pipe sizes and/or ratios will use the same cam track. For instance, the cam track for marking a five inch branch to fit a ten inch run and a four inch branch to fit an eight inch run will be the same.

The cam surface is in effect cut from a sphere as perhaps best indicated in Fig. 4. This sphere, of course, has a hole through its center for receiving the pipe to be cut. The hole through the center of the cam and track member 11 should be of sufficient diameter to receive the larger size pipe to be fabricated by the machine and permit swinging movement of the member 11 to the desired degree from a plane perpendicular to the pipe to be cut. The radial dimension of the cam surface should be such as to prevent the cam surface from assuming too steep an angle at its steepest point and should permit adjustment of the follower along the scribing arm with a reasonable degree of care. On the other hand, the size of the cam should be kept to a minimum to maintain the size of the machine within reasonable limits. In this regard, it is pointed out that any error in the adjustment of the follower relative to the track intended to be engaged will cause an error in the line scribed on the pipe of much less magnitude than the actual error made in positioning the follower.

As has been stated, the cam surface represents a plurality of concentric cam tracks which may be considered to be provided by the telescoped templates cut to provide the desired contour. Each template represents that surface which when engaged by the follower 58 will cause the scribing arm to scribe the desired contour on a pipe.

The contour of the several tracks may be determined by laying out the desired contour on a pipe with a template in the conventional manner and then measuring the distance from the track to the follower at spaced rotative positions about the pipe. The desired cam surface may also be quickly and easily plotted to determine its contour at any rotative position and such a plot is illustrated in Fig. 6. This cam surface is formed on a reverse slope from the cam surface shown in Figs. 1 to 5. Either type of cam may be used. There is shown in Fig. 6 at the line marked zero degrees the contour of the surface for the deepest point of the valley of all cuts to be made. At the line marked thirty degrees, there is shown the contour of the cam at a point thirty degrees from the zero degree point. Likewise, the contour of the cam at sixty degrees and ninety degrees from the zero degree point is shown. While these lines are shown on a single figure, it will be understood that each line represents a cross section through the cam at the rotative positions of zero, thirty, sixty, and ninety degrees.

Before proceeding further with an explanation of this plot, it should be pointed out that the cam surface for all one to one ratio cuts, that is, two inch pipe into a two inch run, four inch pipe into a four inch run, etc., requires a much steeper cam than do the remaining cuts normally desired. Therefore, the cam illustrated and the plot of Fig. 6 provides two cam surfaces, one of which is represented by the zero, thirty, sixty and ninety degree indicia and a second which is represented by the zero prime, thirty degree prime, sixty degree prime and ninety degree prime indicia. For convenience and to eliminate the necessity of an extremely long follower arm or a removable section of the cam surface, the one to one ratios are provided by a shelf 32a cut into the cam-track member 11 at the zero, thirty and sixty degree points as best illustrated in Fig. 6. It will be noted that the cam formed in this way requires a follower of minimum size as the length of cam necessary to reach the shallowest portion of the ninety degree curve of the surface 32 (as shown in Fig. 6) is also approximately the length of follower needed to space the scribing arm from the cam when the cam follower is on the one to one shelf 32a shown in Figs. 2 and 3. In other words, if the zero degree surface be the same for all cuts, then the follower 58 would have to be substantially longer than shown or a portion of the one to one shelf would have to be removable.

In determining the contour of the cam, a guess is first formed as to the desirable radial distance across the cam surface. For a machine designed to fabricate pipe in the range of two and one half through eight inches, it is believed that a cam having a radial dimension of approximately three inches as shown in Fig. 6 will be sufficient. To fashion eight inch pipe, the cam I.D. should be approximately eight inches from the reference point which is the central axis of the pipe to be marked. With these considerations in view, the inner and outer surfaces 62 and 63 of the cam may be plotted as shown. Then a zero degree line 64 may be arbitrarily drawn at approximately the position shown leaving room below this line for the one to one track. Then the zero degree line is extended to the right of Fig. 6 and provides a reference abscissa. At a distance of eight inches from the surface 62 an ordinate is drawn. Then at points spaced from the intersection of the abscissa and ordinate, which represents the reference point, lines are passed through the abscissa parallel to the ordinate. Each of these lines represents a distance equal to one half the outside diameter of representative pipe sizes. Then points are plotted on these lines which represent the maximum longitudinal distance along a pipe of the contour from the valley to the peak of the cut on a particular branch pipe to fit a particular run pipe. Thus, for instance, on the line representing two and one half inch pipe, there would be plotted the points representing the distance from the valley to the peak of a two and one half inch pipe to be fitted to a three inch pipe, a four inch pipe, a five inch pipe and a six inch pipe. Radius lines are then extended from the reference point through these plotted points until they cross lines 62 and 63. Likewise, similar plots are made for various desirable pipe sizes up to eight inches and radius lines from the reference point through plotted points are extended until they cross lines 62 and 63. A portion of the radius line for the plot of an eight inch branch to fit a ten inch run is shown at 65 and a portion of the radius line of the plot for a three inch branch to fit an eight inch run is shown at 66. Exclusive of the one to one ratios of branch to run pipe, it will be found that all of the plotted lines will lie between lines 65 and 66. Therefore, at points spaced slightly inward from points 67 and 68 on the plot, a straight line 69 is drawn which intersects the two radius lines 65 and 66. This line is drawn to intersect lines 65 and 66 at the minimum possible angle. Arcs are then swung about the reference point from the point of intersection of each radius line and the line 69 downward through the graph as illustrated by lines 70 and 71.

The distance from the valleys to the cuts on branch pipes at points sixty degrees removed from the valleys are then determined and plotted in the same manner as the ninety degree points were plotted. Radius lines are extended from the reference point through these plot points until they intersect the arcs swung through the juncture of the ninety degree line 69 and the radius lines representing the ninety degree points, that is, the curved lines such as 70 and 71. A fragment of the radius line representing the eight inch branch to be fitted to a ten inch run is shown at 72 and a fragment of the radius line representing the three inch branch to be fitted to an eight inch run is shown at 73. The points of intersection plotted result in the contour line 74. The thirty degree contour shown at 75 may be determined in like manner. Other contour lines are determined in like manner to give the overall contour of the cam surface 32.

The one to one cut is determined in the same manner and will be found to depart rather sharply from the other contours, particularly at ninety degrees. To avoid a high shelf, the entire one to one cam surface 32a is moved toward the track. In the embodiment illustrated, the surface 32a is moved approximately the length of the follower 58. The results are cam surface 76 at the zero degree point, 77 at the thirty degree point, 78 at the sixty degree point, and 79 at the ninety degree point. These surfaces are struck on radii from the reference point so that the cam track does not necessarily have to be a constant distance from the reference point. In this form the cam-track member 11 may be fashioned as illustrated instead of having to be fashioned in a continuous curve down to the track 31. Note that from approximately the zero degree reference line 64 to the track side of member 11 the radially inner and outer surfaces of the cam are no longer curved.

The Fig. 6 plot, as thus far explained, assumes that the scribing arm is but a line in width and in direct contact with the cam surface. In fact, this is not true as the width dimension of the scribing arm as well as the length of the follower separate the scribing arm from the cam surface. To compensate for this factor, the several surfaces 69, 74, 75, and 64 as well as one to one surfaces 76, 77, 78 and 79 are moved toward the track 31 the distance between the end of the follower and the central axis of the scribing arm.

It will be understood that this is merely an exemplary manner of determining the cross-sectional contour of a suitable cam surface and other methods might be used.

From the foregoing it is believed that the operation of the instrument is apparent. Spacing collars of the desirable size will be selected and secured to the pipe-like body section 14 and the machine slid on the end of the pipe to be fabricated. The lock studs 24 will be tightened to hold the apparatus firmly on the pipe. The cam-track member 11 is swung to the desired degree of intersection and clamped by the wing nut 29. Then the follower will be adjustably positioned to engage the proper cam track. This positioning may be aided by a scale of numerals corresponding to those shown in Fig. 5 with an explanation of the various pipe sizes and ratios that may be cut by the use of the particular cam track. Then the carrier 33 is rotated about the pipe and as the cam surface will force the scribing arm 12 to move longitudinally of the pipe as the carrier is rotated, the correct contour for mating the branch pipe with a run pipe will be scribed on the outside of the pipe. While rotating the spring 50 will urge the linkage members toward fully knuckled position and hold the follower in firm engagement with the cam track.

It will be appreciated that where a cutting tool such as a torch is utilized instead of a soapstone that the cutting torch will also bevel the end of the pipe to better fit the run pipe. However, this is not necessary.

It will be appreciated that the machine illustrated will cut pipe of differing diameters without any adjustment for their difference in diameter. This is true because the scribing arm always points toward the reference point. However, in a case in which it is desirable to have a machine for cutting only a single diameter pipe, it will be appreciated that it will not be necessary to maintain the scribing arm pointing toward the reference point and the supporting means for the scribing arm may permit it to move in a straight line longitudinally of the pipe. In this case, the supporting link members for the scribing arm would be dimensioned to support it in a position perpendicular to the pipe or any other desired position and the cam would be contoured to obtain the desired contour of cut on the pipe.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Pipe fabricating apparatus comprising, an arm, means for mounting said arm for rotation about a pipe and maintaining the arm pointed toward a reference point on the central axis of the pipe while permitting the arm to move longitudinally of the pipe, a cam follower selectively positioned along the arm, cam means cooperable with the cam follower and determining the position of the arm longitudinally of the pipe as the arm is rotated about the pipe, said cam means comprising a plurality of cam tracks of different contour each separately cooperable with the cam follower to cause the arm to follow different paths as it is rotated about the pipe, and means mounted on the arm for performing a fabricating operation on a pipe.

2. Pipe fabricating apparatus comprising, an arm, means for mounting said arm for rotation about a pipe and maintaining the arm pointed toward a reference point on the central axis of the pipe while permitting the arm to move longitudinally of the pipe, a cam follower selectively positioned along the arm, cam means mounted on said means and cooperable with the cam follower and determining the position of the arm longitudinally of the pipe as the arm is rotated about the pipe, said cam means comprising a plurality of cam tracks of different contour each separately cooperable with the cam follower to cause the arm to follow different paths as it is rotated about the pipe, said mounting means for the arm and cam means providing for swinging movement of the arm and cam means about an axis perpendicular to the pipe and passing through the reference point, and means mounted on the arm for performing a fabricating operation on a pipe.

3. Pipe fabricating apparatus comprising, an annular track, means for mounting the track about a pipe with the central axis of the pipe and track passing through a reference point, a carrier mounted for movement along the track, an arm, means mounting the arm on the carrier and maintaining the arm pointed toward said reference point while permitting the arm to move in an arc about the reference point toward and away from the carrier, cam means cooperable with the arm and determining the position of the arm relative to the carrier as the carrier is moved in its track about a pipe, and means mounted on the arm for performing a fabricating operation on a pipe.

4. Pipe fabricating apparatus comprising, an annular track, means for mounting the track about a pipe with the central axis of the pipe and track passing through a reference point, said mounting means providing for rotation of the track about an axis perpendicular to the pipe and passing through the reference point, a carrier mounted for movement along the track, an arm, means mounting the arm on the carrier and maintaining the arm pointed toward said reference point while permitting the arm to move in an arc about the reference point toward and away from the carrier, cam means carried by the track and cooperable with the arm and determining the position of the arm relative to the carrier as the carrier is moved in its track about a pipe, and means mounted on the arm for performing a fabricating operation on a pipe.

5. Pipe fabricating apparatus comprising, an annular track, means for mounting the track about a pipe with the central axis of the pipe and track passing through a reference point, a carrier mounted for movement along the track, an arm, means mounting the arm on the carrier and maintaining the arm pointed toward said reference point while permitting the arm to move in an arc about the reference point toward and away from the carrier, a cam follower selectively positioned along the arm, cam means cooperable with the cam follower and determining the position of the arm longitudinally of the pipe as the arm is rotated about the pipe, said cam means comprising a plurality of cam tracks of different contour each separately cooperable with the cam follower to cause the arm to follow different paths as it is rotated about the pipe, and means mounted on the arm for performing a fabricating operation on a pipe.

6. Pipe fabricating apparatus comprising, an annular track, means for mounting the track about a pipe with the central axis of the pipe and track passing through a reference point, said mounting means providing for rotation of the track about an axis perpendicular to the pipe and passing through the reference point, a carrier mounted for movement along the track, an arm, means mounting the arm on the carrier and maintaining the arm pointed toward said reference point while permitting the arm to move in an arc about the reference point toward and away from the carrier, a cam follower selectively positioned along the arm, cam means carried by the track and cooperable with the follower and determining the position of the arm relative to the carrier as the carrier is moved in its track about a pipe, said cam means comprising a plurality of cam tracks of different contour each separately cooperable with the cam follower to cause the arm to follow different paths as it is rotated about the pipe, and means mounted on the arm for performing a fabricating operation on a pipe.

7. Pipe fabricating apparatus comprising; a carrier; means for mounting the carrier for rotation about a pipe; an arm having means thereon for performing a fabricating operation on a pipe; expansible linkage means mounting the arm on the carrier and maintaining the arm pointed toward a reference point while permitting the arm to move in an arc about said point toward and away from the carrier comprising, a tie rod, a first pair of link members hinged between the carrier and tie rod and between the arm and tie rod, a second pair of link members hinged between the carrier and tie rod and between the arm and tie rod, and means maintaining the arm a fixed distance from said reference point, said first and second pair of link members dimensioned to maintain the arm pointed toward said point as the pairs of link members are knuckled to move the arm toward and away from the carrier; and cam means cooperable with the arm and determining the position of the arm relative to the carrier as the carrier is rotated about a pipe.

8. Pipe fabricating apparatus comprising; a carrier; means for mounting the carrier for rotation about a pipe; an arm having means thereon for performing a fabricating operation on a pipe; expansible linkage means mounting the arm on the carrier and maintaining the arm pointed toward a reference point while permitting the arm to move in an arc about said point toward and away from the carrier comprising, a tie rod, a first pair of link members hinged between the carrier and tie rod and between the arm and tie rod, a second pair of link members hinged between the carrier and tie rod and between the arm and tie rod, and a third pair of link members hinged to the carrier and arm at the hinge points of one of said first and second pair and having a sliding connection with the tie rod, said three pairs of link members cooperative to maintain the arm a fixed distance from said point, said first and second pair of link members dimensioned to maintain the arm pointed toward said point as the pairs of link members are knuckled to move the arm toward and away from the carrier; and cam means cooperable with the arm and determining the position of the arm relative to the carrier as the carrier is rotated about a pipe.

9. A pipe fabricating apparatus comprising; an annular track; means for mounting the track about a pipe with the central axis of the pipe and track passing through a reference point; said mounting means providing for rotation of the track about an axis perpendicular to the pipe and passing through the reference point; a carrier mounted for movement along the track; an arm; means mounting the arm on the carrier and maintaining the arm pointed toward said reference point while permitting the arm to move in an arc about the reference point toward and away from the carrier comprising, a tie rod, a first pair of link members hinged between the carrier and tie rod and between the arm and tie rod, a second pair of link members hinged between the carrier and tie rod and between the arm and tie rod, a third pair of link members hinged to the carrier and arm at the hinge points of one of said first and second pair and having a sliding connection with the tie rod, said three pairs of link members cooperating to maintain the arm a fixed distance from said point, said first and second pair of link members dimensioned to maintain the arm pointed toward said point as the pairs of link members are knuckled to move the arm toward and away from the carrier; a cam follower carried by the arm; cam means carried by the track and cooperable with the follower and determining the position of the arm relative to the carrier as the carrier is moved in its track about a pipe; and means mounted on the arm for performing a fabricating operation on a pipe.

10. The apparatus of claim 9 wherein the means for performing a fabricating operation on a pipe is a scribing means which is adjustably positioned between the reference point and the arm to scribe pipe of different diameter.

11. The apparatus of claim 9 wherein the cam follower is adjustably positioned along the arm, and the cam means comprises a plurality of cam tracks of different contour each separately cooperable with the cam follower to cause the arm to follow different paths as it is rotated about the pipe.

12. Pipe fabricating apparatus comprising a carrier; means for mounting the carrier for rotation about a pipe; an arm having means thereon for performing a fabricating operation on a pipe; expansible linkage means mounting the arm on the carrier for movement in an arc about a reference point on the axis of said pipe toward and away from the carrier and operating in response to such movement to maintain the arm pointed toward such reference point; and cam means cooperable with the arm in determining the position of the arm relative to the carrier as the carrier is rotated about a pipe.

References Cited in the file of this patent

UNITED STATES PATENTS

| | | |
|---|---|---|
| 1,852,412 | Hickey | Apr. 5, 1932 |
| 2,408,517 | Howard | Oct. 1, 1946 |
| 2,432,703 | Walden | Dec. 16, 1947 |
| 2,459,823 | Lebedeff | Jan. 25, 1949 |
| 2,611,183 | Thrower | Sept. 23, 1952 |